(12) United States Patent
Fong (10) Patent No.: US 9,692,196 B2
(45) Date of Patent: Jun. 27, 2017

(54) CABLE WIRE BRUSHING CONNECTOR (71) Applicant: Thomas & Betts International, LLC, Wilmington, DE (US)

(72) Inventor: Robert Fong, Bethlehem, PA (US)

(73) Assignee: Thomas & Betts International LLC, Wilmington, DE (US)

( * ) Notice: Subject to any disclaimer, the term of this patent is extended or adjusted under 35 U.S.C. 154(b) by 0 days.

(21) Appl. No.: 15/000,574

(22) Filed: Jan. 19, 2016

(65) Prior Publication Data

US 2016/0248209 A1    Aug. 25, 2016

Related U.S. Application Data (60) Provisional application No. 62/120,050, filed on Feb. 24, 2015.

(51) Int. Cl.
| H01R 39/00 | (2006.01) |
| H01R 39/36 | (2006.01) |
| H01R 4/26 | (2006.01) |
| H01R 4/36 | (2006.01) |
| H01R 11/09 | (2006.01) |
| H01R 43/00 | (2006.01) |
| H01R 43/12 | (2006.01) |
| H02G 3/04 | (2006.01) |
| H01R 4/01 | (2006.01) |
| H01R 11/05 | (2006.01) |

(52) U.S. Cl.
CPC .............. H01R 39/36 (2013.01); H01R 4/26 (2013.01); H01R 4/36 (2013.01); H01R 11/09 (2013.01); H01R 43/002 (2013.01); H01R 43/12 (2013.01); H02G 3/0406 (2013.01); H01R 4/01 (2013.01); H01R 11/05 (2013.01)

(58) Field of Classification Search
CPC ...... H01R 39/36; H01R 43/12; H01R 43/002; H01R 11/09; H01R 4/26; H01R 4/36; H01R 11/05; H01R 4/01; H02G 1/02; H02G 3/0406; A46B 9/02
USPC ......................................................... 439/13
See application file for complete search history.

(56) References Cited

U.S. PATENT DOCUMENTS

| 18,451 A | 10/1857 | Hood |
| 1,750,501 A | 3/1930 | Armstrong |

(Continued)

FOREIGN PATENT DOCUMENTS

| EP | 2518831 A1 | 10/2012 |
| JP | 2000021385 A | 1/2000 |

OTHER PUBLICATIONS

European Patent Office; European Search Report issues in corresponding Application No. 16155173.4; dated Jul. 18, 2016; 11 pages.

*Primary Examiner* — Javaid Nasri
(74) *Attorney, Agent, or Firm* — Taft Stettinius & Hollister LLP (57) ABSTRACT

An electrical connector includes a body having a bore and an interior surface. The bore is sized to receive a cable conductor of an electrical power cable. The body includes a groove disposed along a length of the interior surface. A wire brush insert is located within the groove and includes a plurality of bristles that extend into at least a portion of the bore. Rotating the cable wire brushing connector relative to the cable conductor cleans the cable conductor prior to securing the cable conductor within the cable wire brushing connector.

18 Claims, 10 Drawing Sheets

(56) References Cited

U.S. PATENT DOCUMENTS

| | | | |
|---|---|---|---|
| RE18,451 E | | 5/1932 | Weimer et al. |
| 2,793,350 A | | 5/1957 | Anderson |
| 3,527,611 A | | 9/1970 | Newfarmer |
| 4,169,427 A | * | 10/1979 | Crump .................. B08B 1/008 118/307 |
| 4,269,465 A | | 5/1981 | Mueller |
| 4,494,812 A | | 1/1985 | Bolton |
| 4,830,624 A | | 5/1989 | Rose et al. |
| 5,087,214 A | | 2/1992 | Dewar |
| 5,183,419 A | | 2/1993 | Dewar |
| 5,556,309 A | | 9/1996 | Sharpe et al. |
| 5,558,545 A | | 9/1996 | Staab et al. |
| 5,915,758 A | | 6/1999 | Alfiero |
| 7,274,964 B2 | | 9/2007 | Balsells |
| 7,614,907 B2 | | 11/2009 | Zhang |
| 7,914,351 B2 | | 3/2011 | Balsells et al. |
| 8,465,594 B1 | | 6/2013 | Harder |
| 8,529,303 B2 | | 9/2013 | Zhang |
| 2003/0092325 A1 | | 5/2003 | Schad et al. |
| 2009/0038090 A1 | | 2/2009 | Beck et al. |
| 2009/0233547 A1 | | 9/2009 | Ong et al. |
| 2014/0220836 A1 | | 8/2014 | Schmidt et al. |

\* cited by examiner

CABLE WIRE BRUSHING CONNECTOR

CROSS-REFERENCE TO RELATED APPLICATION

This application claims priority under 35 U.S.C. §119, based on U.S. Provisional Patent Application No. 62/120,050 filed Feb. 24, 2015, the disclosure of which is hereby incorporated by reference herein.

BACKGROUND OF THE INVENTION

The present invention relates to electrical cable connectors, such as connectors for joining electrical power cables at a power cable joint or joining a power cable to a separable connector, such as a loadbreak connector or deadbreak connector.

DETAILED DESCRIPTION OF THE PREFERRED EMBODIMENTS

The following detailed description refers to the accompanying drawings. The same reference numbers in different drawings may identify the same or similar elements.

It is recommended, for installation of cable connectors available in the industry, that a cable conductor, onto which the connector will be installed, should be wire brushed before the installation. Wire brushing is recommended to remove any contamination and/or oxidation that might be present on the surface of the cable conductor.

In one implementation, an electrical connector is provided that includes an integrated wire brush insert. The electrical connector includes a body having a bore and an interior surface. The bore is sized to receive a cable conductor of an electrical power cable. The body includes a groove disposed along a length of the interior surface. A wire brush insert is located within the groove and includes a plurality of bristles that extend into at least a portion of the bore. Rotating the cable wire brushing connector relative to the cable conductor cleans the cable conductor prior to securing the cable conductor within the cable wire brushing connector.

Figure 1:
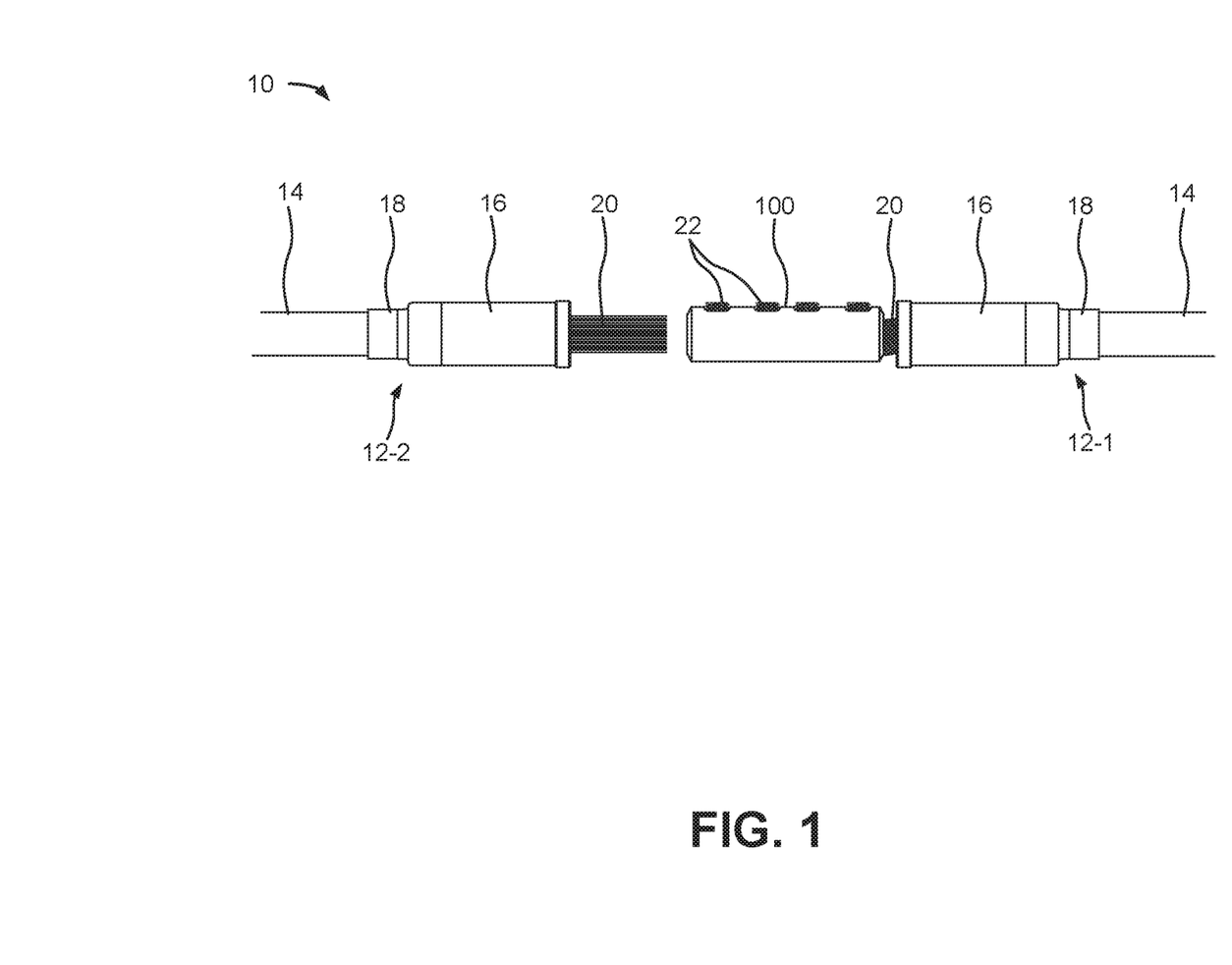
FIG. 1 is a schematic side view illustrating a portion of an exemplary system where a cable connector described herein may be implemented.

FIG. 1 is a schematic side view illustrating a portion of an exemplary connector system 10 in which a connector described herein may be implemented. Two power cable assemblies 12-1 and 12-2 (collectively referred to as "power cable assemblies 12," and generically as "power cable assembly 12") may be joined by a cable connector 100. For example, power cable assembly 12-1 may include a supply cable and power cable assembly 12-2 may include a load cable.

Each power cable assembly 12 may be prepared to allow a power cable 14 to be connected to cable connector 100. Each power cable assembly 12 may include, for example, power cable 14, an adapter 16, a cable receptacle 18, and a cable conductor 20. As shown in FIG. 1, each adapter 16 may be disposed rearwardly relative to cable conductor 20. Adapter 16 may be affixed to power cable 14 and may provide a frictional engagement with a rearward portion of a respective cable receptacle 18. In one implementation, adapter 16 may be formed of an insulative material, such as rubber, a thermoplastic, or epoxy.

As described in additional detail below, cable connector 100 may connect power cable assemblies 12 to each other, such that power supplied to one cable is transmitted to the other cable. Cable connector 100 may include a substantially cylindrical assembly configured to receive a cable conductor 20 of power cable 14 therein. During connection of power cable assembly 12, set screws 22 or bolts may inserted through openings in a side wall of cable connector 100 to physically secure cable conductor 20 within cable connector 100. In one implementation, set screws 22 may include shear bolts that are designed so that a top portion of each set screw 22 will break off upon application of a particular maximum torque.

In some implementations, connector system 10 may be placed within a protective sleeve, wrap, insulation, and/or another protective layer. Although described herein as used for connecting two cables, in other implementations, cable connector 100 may be modified for use in other types of connections. For example, in one implementation, cable connector 100 may include a spade portion or another type of connection on one end that can be secured within another connection system, such as a separable connector.

Figure 2:
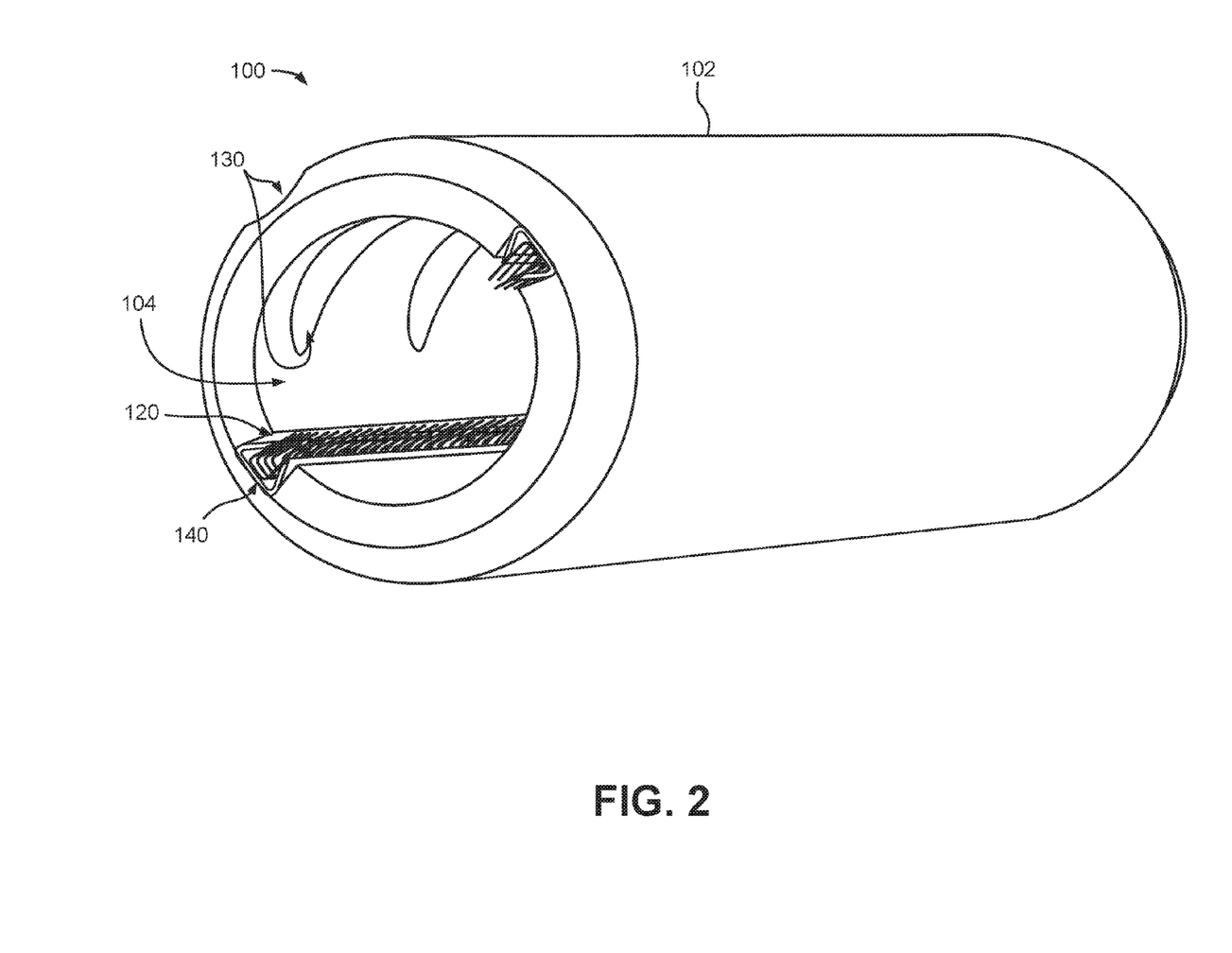
FIG. 2 is a simplified isometric view of the cable connector of FIG. 1, according to an implementation described herein.
Figure 3:
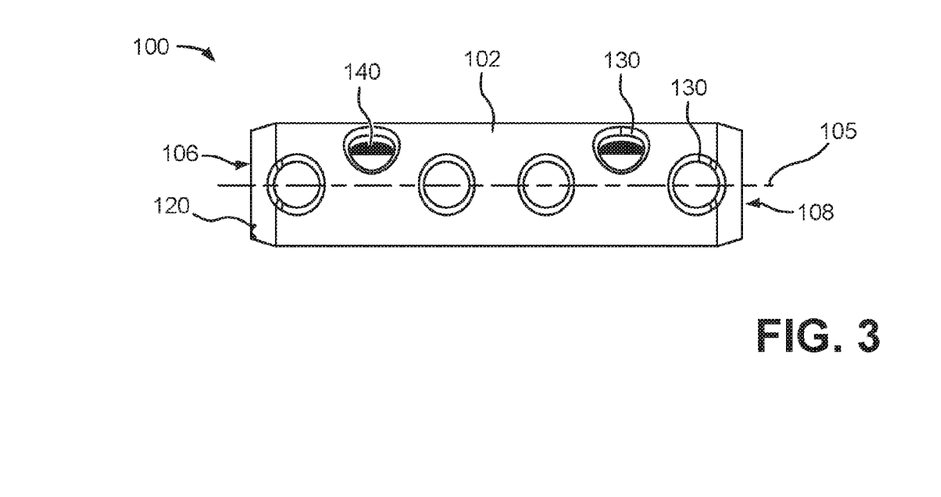
FIG. 3 is a side view of the cable connector of FIG. 1.
Figure 4:
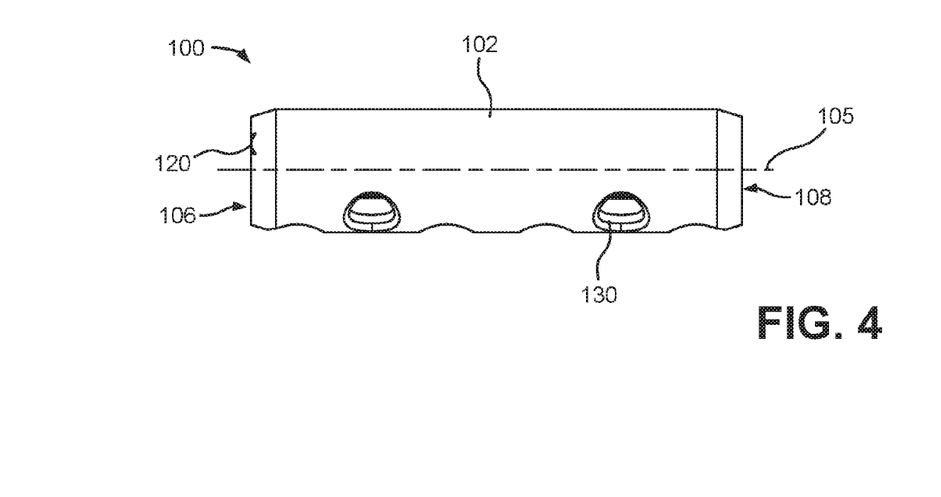
FIG. 4 is a top view of the cable connector of FIG. 1.
Figure 5:
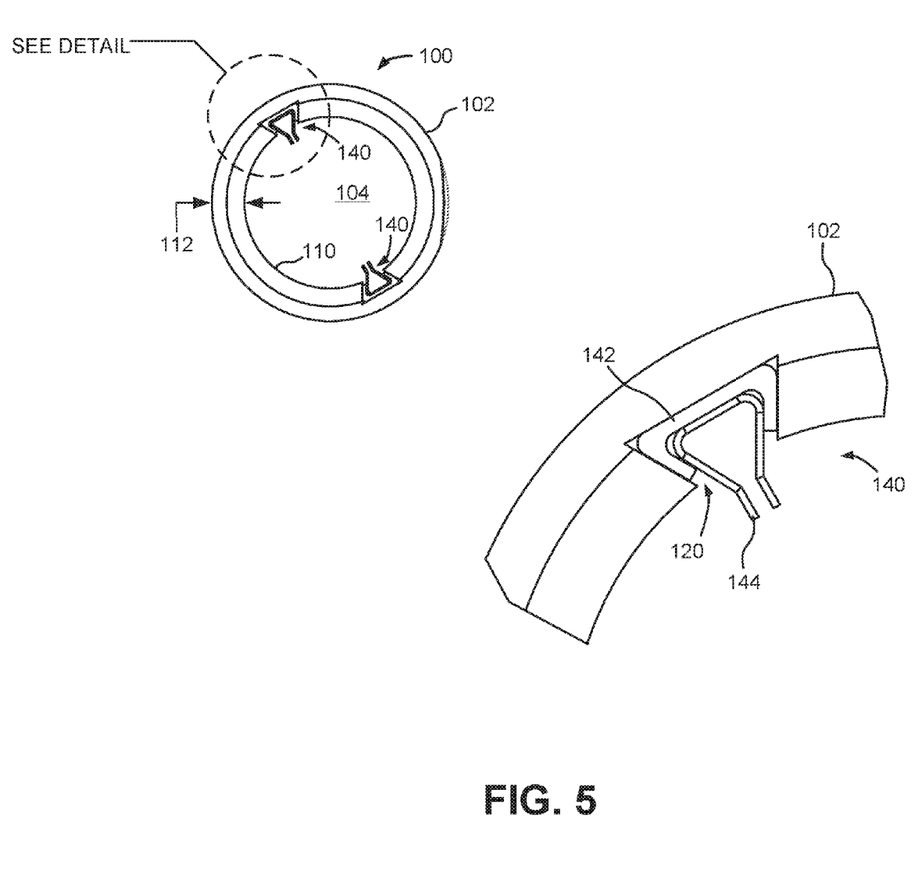
FIG. 5 is an end view of the cable connector of FIG. 1, shown with an enlarged detail of a wire brush insert, according to an implementation described herein.
Figure 6:
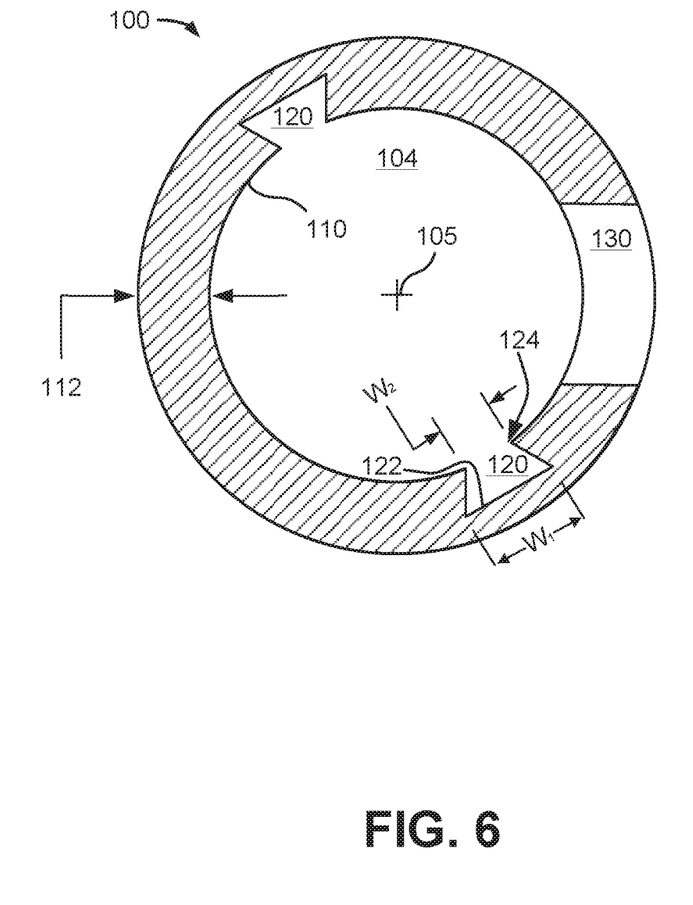
FIG. 6 is a simplified cross-sectional end view of a connector body of the cable connector of FIG. 1.

FIG. 2 is a simplified isometric view of cable connector 100 according to an implementation described herein. FIG. 3 is a side view and FIG. 4 is a top view of cable connector 100. FIG. 5 is an end view of cable connector 100 shown with an enlarged detail of a wire bristle holder, according to an implementation described herein. FIG. 6 is a simplified cross-sectional end view of a connector body of the cable connector 100.

Referring collectively to FIGS. 2-6, cable connector 100 may include a generally cylindrical body 102. Cylindrical body 102 may include an axial bore 104 (i.e., along an axis 105) with openings 106, 108 at either end and sized to receive cable conductors 20. An interior surface 110 of cylindrical body 102 extends along the length of axial bore 104. Cylindrical body 102 may generally have a wall thickness 112 sufficient to physically support cable conductors 20 when set screws 22 (FIG. 1) are inserted to press cable conductors 20 against interior surface 110. The wall thickness 112 may also be sufficient to provide a required cross-sectional area necessary to conduct electrical current (e.g., up to a designed limit) between cable conductors 20. Cylindrical body 102 may be formed (e.g., machined) from an electrically conductive material, such as copper, aluminum, a copper-aluminum alloy, etc.

According to implementation described herein, cylindrical body 102 may include one or more grooves 120 and one or more set screw holes 130. Grooves 120 may extend along interior surface 110. In one implementation, grooves 120 may extend along the entire axial length of body 102 parallel to axis 105. In another implementation, grooves 120 may extend along one or more portions of the axial length of body 102. In other implementations, grooves 120 may form a spiral channel along a portion of interior surface 110 along the axial length of body 102. Each groove 120 may include a groove base 122 recessed within cylindrical body 102 (e.g., away from interior surface 110) and a groove opening 124 that is adjacent to interior surface 110 and facing axial bore 104. In one implementation (as shown, for example, in FIG. 6), the cross-sectional shape of groove 120 may resemble a trapezoid with the cross-sectional width, $W_1$, of groove base 122 being larger than the cross-sectional width, $W_2$, of groove opening 124. The actual widths $W_1$ and $W_2$ may vary based on the sizes of cable connector 100.

Each of set screw holes 130 may provide a hole through cylindrical body 102 at an orientation substantially orthogonal to axis 105 of cylindrical body 102 and axial bore 104. Each of set screw holes 130 may be threaded (threading not shown in the figures for clarity) and sized to receive a set screw 22. When a cable conductor 20 is placed within axial bore 104 of cable connector 100, a set screw 22 may be inserted through hole 130 to secure cable conductor 20 within cylindrical body 102 and to ensure contact between cable conductor 20 and cylindrical body 102.

Figures 7A, 7B, 7C:
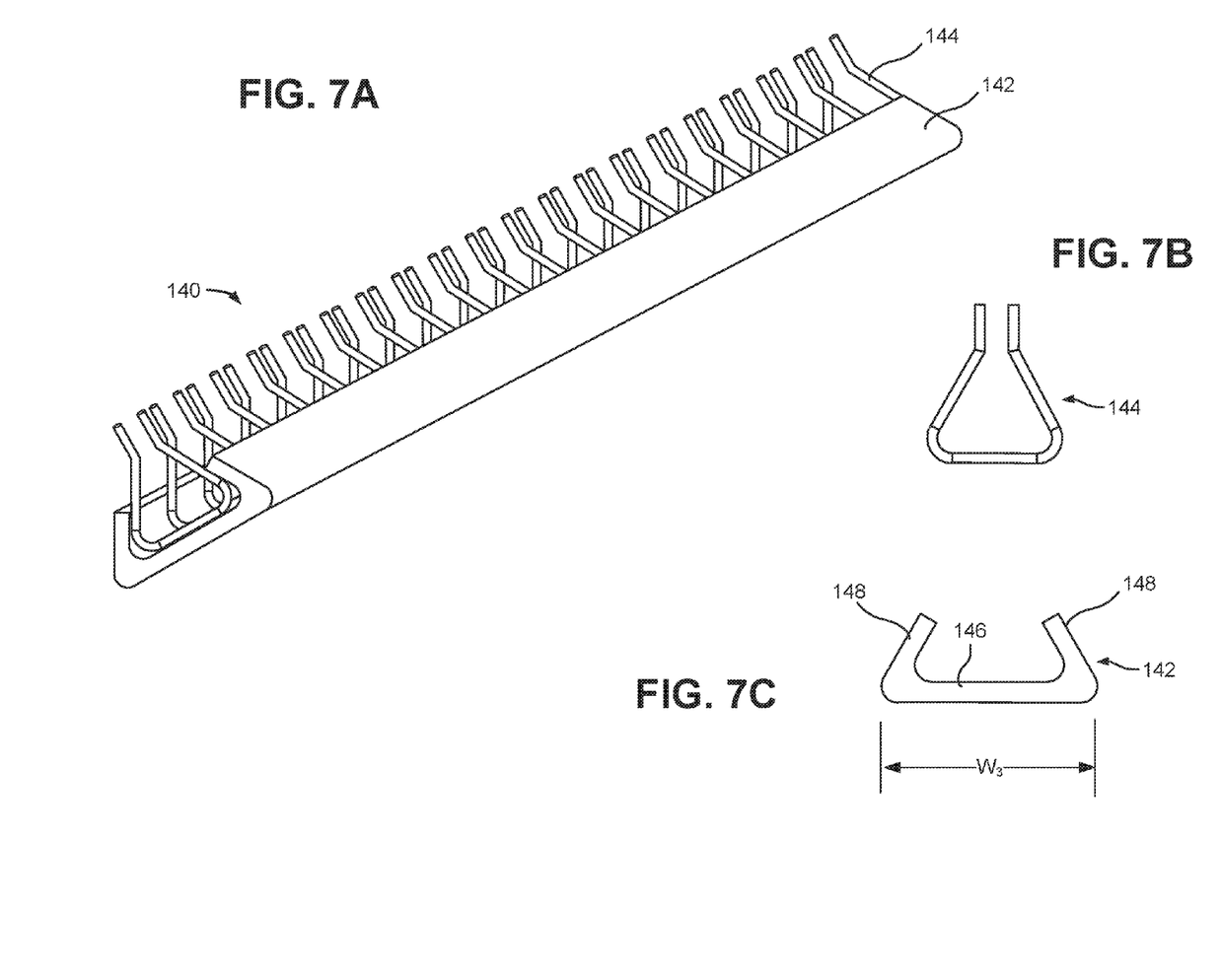
FIGS. 7A-7C include a simplified isometric view of the wire brush insert, a schematic end view of a wire bristle holder, and a schematic end view of wire bristles, respectively.

Cable connector 100 may include a wire brush insert 140 within each of grooves 120. FIG. 7A is a simplified isometric view of wire brush insert 140. Wire brush insert 140 may include a wire bristle holder 142 and wire bristles 144. FIG. 7B is a schematic end view of wire bristle holder 142, and FIG. 7C is a schematic end view of wire bristles 144. Wire bristle holder 142 may generally provide a base to hold wire bristles 144 and to secure wire brush insert 140 within one of grooves 120. Wire bristle holder 142 may include a base 146 with a cross-sectional width, $W_3$, that can fit within groove 120 and is larger than the cross-sectional width, $W_2$, of groove opening 124 (FIG. 6) but smaller than cross-sectional width $W_1$. Thus, wire bristle holder 142 may be constrained within groove 120 and prevented from moving into axial bore 104 (e.g., when a cable conductor is not inserted in axial bore 104). A pair of side walls 148 may extend from base 146. Side walls 148 may grip wire bristles 144 to retain wire bristles 144 within wire brush insert 140. The height of side walls 148 may be less than or equal to the depth of groove 120 so as to prevent side walls from extending into axial bore 104 and contacting cable conductor 20.

Wire bristles 144 may be positioned to extend beyond the upper surface of side walls 148 and, when installed in groove 120, beyond the depth of groove 120. When wire brush insert 140 is inserted into groove 120, wire bristle holder 142 may keep wire bristles 144 directed into axial bore 104. Wire bristles 144 may be made from stainless steel, aluminum, brass, or another material that can provide sufficient stiffness for removal of rust, oxidation, corrosion, etc., from an out surface of cable conductor 20. In one implementation, wire bristles 144 may be strung together by a connecting wire or another connection type (not shown), twisted together, or otherwise mounted within wire bristle holder 142.

In one implementation, wire bristle holder 142 may be fabricated from a single metal sheet and formed (e.g., bent) into a shape (e.g., shown in FIGS. 5 and 7C) that can be retained within groove 120. In another implementation, wire bristle holder 142 may be cast or otherwise fabricated. Wire bristle holder 142 may be made, for example, from a stainless steel or another non-corrosive material. In one implementation, wire brush insert 140 may be retained lengthwise (i.e., parallel to axis 105) within groove 120 via a press fit (also referred to as an interference fit or friction fit). In another implementation, base 146 may include a small overhang (e.g., 152, FIG. 11) or clip at one or both ends to engage cylindrical body 102 at opening 106 and/or opening 108.

Figure 8:
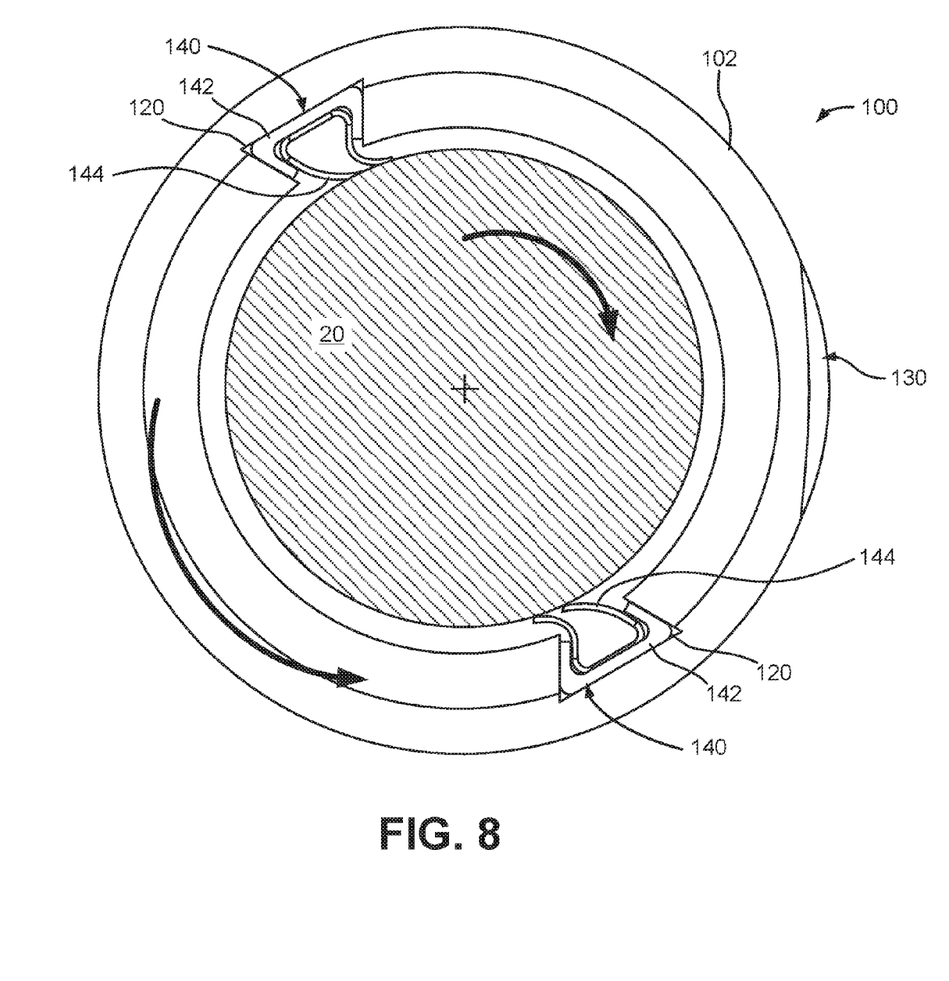
FIG. 8 is a schematic end view of the cable connector of FIG. 1 shown with a cross-section of a cable conductor rotating therein.

Wire brush insert 140 may be inserted into a groove 120 by sliding wire brush insert 140 into groove 120 parallel to axis 105 from either opening 106 or 108. When wire brush insert 140 is inserted into groove 120, wire bristles 144 may extend past groove 120 into axial bore 104 of cylindrical body 102. FIG. 8 is a schematic end view of cable connector 100 shown with a cross-section of cable conductor 20 rotating therein. As shown in FIG. 8, when cable conductor 20 is inserted in to either end of cable connector 100, wire bristles 144 will contact cable conductor 20. Rotating cable connector 100 at least 180 degrees relative to cable conductor 20 will cause wire bristles 144 to engage the entire exterior surface of cable conductor 20 that is within axial bore 104. In another configuration, a single wire brush insert 140 may be included in cable connector 100, such that one 360 degree rotation of cable connector 100 relative to cable conductor 20 would be required for wire bristles 144 to engage the entire circumference of the exterior surface of cable conductor 20 within axial bore 104.

Figure 9:
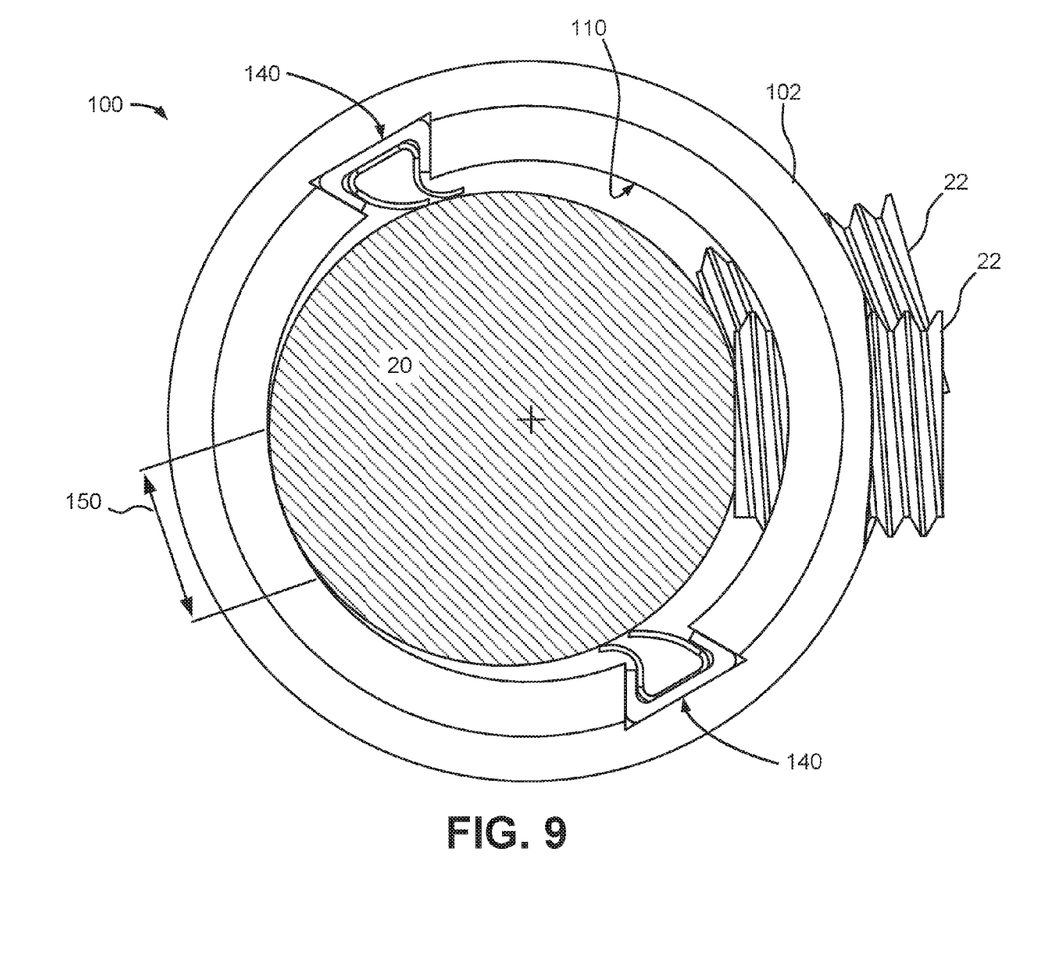
FIG. 9 is a schematic end view of the cable connector of FIG. 1 shown with a cross-section of the cable conductor secured therein.

FIG. 9 is a schematic end view of cable connector 100 shown with a cross-section of cable conductor 20 secured therein. As shown, for example, in FIG. 9, grooves 120 may be positioned along interior surface 110 of cylindrical body 102 so that wire brush insert 140 avoids contact with set screws 22 and allows contact between interior surface 110 and cable conductor 20 when set screws 22 are applied to or contact cable conductor 20. For example, as shown in FIG. 9, a contact zone 150 along interior surface 110 may be defined generally opposite set screw holes 130, where forces from inserted set screws 22 cause cable conductor 20 to press against interior surface 110. Grooves 120 and wire brush inserts 140 may be positioned to permit insertion of set screws 22. Additionally, grooves 120 and wire brush inserts 140 may be positioned to allow cable conductor 20 to press against interior surface 110 within contact zone 150. In one implementation, grooves 120 may be positioned outside of contact zone 150. In another implementation, grooves 120 may be positioned, for example, at least 20 degrees in the radial direction, along interior surface 110, from either side of contact zone 150. Wire bristles 144 may deform or bend as inserted set screws 22 push cable conductor 20 toward contact zone 150.

If more than one set of grooves 120 and wire brush inserts 140 are used, grooves 120 and wire brush inserts 140 may be positioned symmetrically about interior surface 110 or asymmetrically about interior surface 110. For example, as shown in FIG. 6, two sets of grooves 120 are located with their midpoints approximately 180 degrees apart. In other implementations, the midpoints of grooves 120 may be located less than 180 degrees apart. It should also be understood that more than two grooves 120/wire brush inserts 140 may be used in various implementations.

Figure 10:
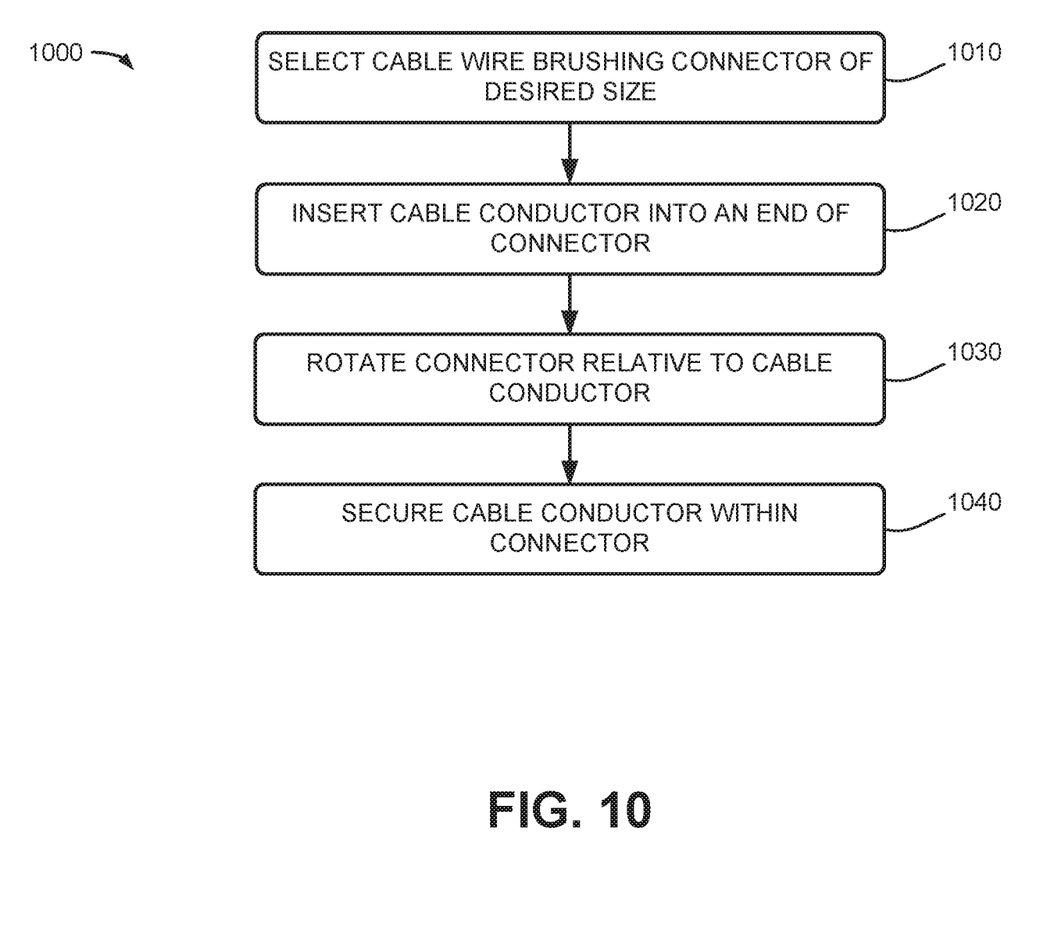
FIG. 10 is a flow diagram of an exemplary process for connecting a power cable using a cable wire brushing connector, according to an implementation described herein.

FIG. 10 is a flow diagram of an exemplary process 1000 for connecting a power cable using a cable wire brushing connector, according to an implementation described herein. Process 1000 may include selecting a cable wire brushing connector of a desired size (block 1010). For example, a technician may select connector 100 with an appropriate diameter to receive a cable conductor 20 within axial bore 104. Connector 100 may include one or more wire brush inserts 140.

Process 1000 may further include inserting the cable conductor into an end of the connector (block 1020) and rotating the connector relative to the cable conductor (block 1030). For example, a technician may insert cable conductor 20 into axial bore 104 of connector 100, such that bristles 144 of wire brush inserts 140 contact cable conductor 20. After cable conductor 20 is inserted into axial bore 104, the technician may rotate either connector 100 or cable conductor 20 to cause wire bristles 144 to contact and scrub the outer surface of conductor 20. Depending on the arrangement and number of wire brush inserts 140 in connector 100, the technician may rotate the connector up to 360 degrees to ensure that wire bristles 144 contact the complete circumference of the surface of cable conductor 20 that is within axial bore 104. In one implementation, multiple back-and-forth rotations may be used to remove contamination and/or oxidation that might be present on the surface of cable conductor 20.

Process 1000 may also include securing the cable conductor within the connector (block 1040). For example, without removing cable conductor 20 from connector 100, a technician may tighten set screws 22 into connector 100 to secure cable conductor 20 with axial bore 104. In one implementation, set screws 22 may cause cable conductor 20 to press against contact area 150 and become slightly deformed. The deformation of cable conductor 20 may also cause wire bristles 144 to deform. Wire bristles 144 may bend back into grooves 120 or be captured or held between cable conductor 20 and surface 110. In this manner, wire bristles 144 will not interfere with the electrical connection (e.g., between cable conductor 20 and body 102).

Figure 11:
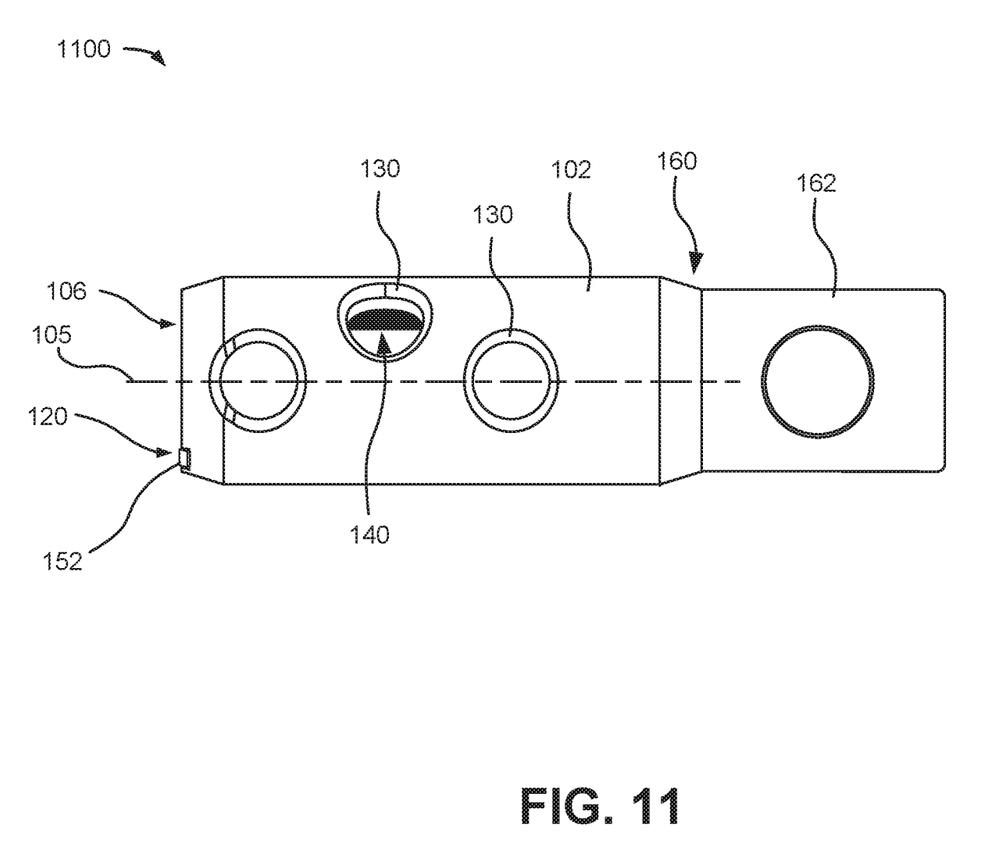
FIG. 11 is a side view of a cable connector according to another implementation described herein.

FIG. 11 is a side view of a cable connector according to another implementation described herein. As shown in FIG. 11, a cable connector 1100 may include one side, with opening 106 configured similarly to that of cable connector 100, including cylindrical body 102, an axial bore (e.g., axial bore 104, not labeled) along axis 105, one or more grooves 120, set screw holes 130, and wire brush inserts 140. In contrast with cable connector 100, cable connector 1100 may include a transition region 160 where the axial bore, grooves 120, set screw holes 130, and wire brush inserts 140 terminate. Transition region 160 may connect cylindrical body 102 to a spade portion 162. Spade portion 162 may be connected to another connector (not shown). For example, a threaded fastener may be inserted through a hole in spade portion 162 and a spade portion or another connector.

Still referring to FIG. 11, an overhang 152 or clip may be included on the end of wire brush insert 140 (e.g., wire bristle holder 142). Overhang 152 may extend past the end of groove 120 and may secure wire brush insert 140 from moving parallel to axis 105 within groove 120. In other implementations (e.g., where groove 120 extends to an opening on each end of body 102), overhang 152 may be included on both ends of wire brush insert 140.

According to an implementation described herein, an electrical connector includes a cylindrical body having a bore and an interior surface. The bore extends through the length of the body from a first opening to a second opening and is sized to receive a cable conductor of an electrical power cable. The body may include a first groove disposed along a first portion of a length of the interior surface and a second groove disposed along a second portion of the length of the interior surface. A first wire brush insert may be disposed within the first groove, and a second wire brush insert may be disposed within the second groove. The first wire brush insert and the second wire brush insert may each include a plurality of wire bristles that extend into at least a portion of the bore. The wire bristles may be used to remove contamination, oxidation, or other potential debris/contaminants from the cable conductor without interfering with any electrical connections.

The above-described cable wire brushing connector integrates the wire brush into an electrical connector whereby reducing the possibility of neglecting a recommended wire brushing operation when making a connection. The end user would simply rotate the connector after the connector is inserted over the cable conductor, which would remove contamination from the cable conductor. Also, since the wire brush is integrated within the connector, the overall installation time can be reduced.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments. For example, implementations described herein may also be used in conjunction with other devices, such as high, medium, or low voltage switchgear equipment, including 15 kV, 25 kV, or 35 kV equipment.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above-mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. An electrical connector, comprising:
    a body having a bore and an interior surface, wherein the bore is sized to receive a cable conductor of an electrical power cable, and wherein the body includes a groove disposed along a length of the interior surface, one or more set screw holes extending through a portion of the body and configured to receive a set screw, wherein, when inserted through one of the one or more set screw holes the set screw presses the cable conductor against a contact area on the interior surface, the groove being located on a portion of the interior surface that is outside the contact area; and
    a wire brush insert located within the groove, wherein the wire brush insert includes a plurality of bristles that extend into at least a portion of the bore.

2. The electrical connector of claim 1, wherein the plurality of bristles engage the cable conductor when the cable conductor is inserted into the bore, and wherein the body is rotated relative to the cable conductor to brush an outer surface of the cable conductor.

3. The electrical connector of claim 1, wherein the groove includes a base recessed from the interior surface and an opening adjacent to the interior surface, and wherein a cross-sectional width of the base is larger than a cross-sectional width of the opening.

4. The electrical connector of claim 1, wherein the one or more set screw holes are orthogonal to an axis of the bore.

5. The electrical connector of claim 1, wherein the body comprises a first wire brush insert disposed within the groove and a second wire brush insert disposed within a second groove, wherein the first wire brush insert is positioned along a first portion of the interior surface between the contact area and the set screw holes, wherein the second wire brush insert is positioned along a second portion of the interior surface between the contact area and the set screw holes, wherein the first portion is opposite the second portion.

6. The electrical connector of claim 5, wherein the first wire brush insert and the second wire brush insert are positioned at opposite points along a circumference of the interior surface.

7. The electrical connector of claim 1, wherein the bore extends through a portion of the length of the body from a first opening at a first end, and wherein the body comprises a spade portion at a second end.

8. The electrical connector of claim 1, wherein the wire brush insert includes a bristle holder that secures the wire brush insert in the groove and orients the bristles into the bore.

9. The electrical connector of claim 1, wherein the wire brush insert is retained within the groove via a press fit.

10. The electrical connector of claim 1, wherein the bore extends through an entire length of the body from a first opening to a second opening.

11. The electrical connector of claim 10, wherein the wire brush insert includes an overhang on at least one end to engage the body at the first opening and prevent movement in an axial direction.

12. The electrical connector of claim 1, wherein body comprises one or more of copper and aluminum.

13. An electrical connector, comprising:
a cylindrical body having a bore and an interior surface,
wherein the bore extends through an axial length of the body from a first opening to a second opening,
wherein the bore is sized to receive a cable conductor of an electrical power cable,
wherein the body includes a first groove disposed along a first portion of a length of the interior surface,
wherein the body includes a second groove disposed along a second portion of the length of the interior surface,
wherein the body includes a plurality of set screw holes extending through a portion of the body and configured to receive a set screw, wherein, when inserted through one of the plurality of set screw holes the set screw presses the electrical power cable against a contact area on the interior surface, the first and second grooves located on portions of the interior surface that are outside of the contact area;
a first wire brush insert disposed within the first groove; and
a second wire brush insert disposed within the second groove,
wherein the first wire brush insert and the second wire brush insert each include a plurality of bristles that extend into at least a portion of the bore.

14. The electrical connector of claim 13, wherein the plurality of bristles engage the cable conductor when the cable conductor is inserted into the bore, and wherein the body is rotated relative to the cable conductor to brush an outer surface of the cable conductor.

15. The electrical connector of claim 14, wherein the plurality of set screw holes are oriented orthogonally to the bore.

16. The electrical connector of claim 13, wherein the first groove and the second groove each include a base recessed from the interior surface and an opening adjacent to the interior surface, and wherein a cross-sectional width of the base is larger than a cross-sectional width of the opening.

17. A method for securing a cable conductor within an electrical connector, the method, comprising:
selecting a cable wire brushing connector of a size to accommodate a desired cable conductor of an electrical power cable, wherein the cable wire brushing connector includes:
a body having a bore, an interior surface, and a hole in a wall of the body, wherein the bore is sized to receive the cable conductor, and wherein the body includes a groove disposed along a length of the interior surface, the hole extending through a portion of the body and configured to receive a set screw, and
a wire brush insert disposed within the groove, wherein the wire brush insert includes a plurality of bristles that extend into at least a portion of the bore;
inserting the cable conductor into an end of the cable wire brushing connector;
rotating the cable wire brushing connector relative to the cable conductor; and
securing the cable conductor within the cable wire brushing connector, including inserting a set screw through the hole or press the cable conducted against a contact area on the interior surface, the groove being located on a portion of the interior surface that is outside the contact area.

18. The method of claim 17, wherein the rotating includes scrubbing by the plurality of bristles an outer surface of the cable conductor to remove debris or contaminants from the outer surface.

* * * * *